(12) United States Patent
Ohba et al.

(10) Patent No.: US 8,791,992 B2
(45) Date of Patent: Jul. 29, 2014

(54) CONTENT PLAYBACK DEVICE, CONTENT PLAYBACK METHOD, AND CONTENT DISPLAY

(75) Inventors: Akio Ohba, Kanagawa (JP); Hiroyuki Segawa, Kanagawa (JP); Tetsugo Inada, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 630 days.

(21) Appl. No.: 13/025,485

(22) Filed: Feb. 11, 2011

(65) Prior Publication Data
US 2011/0285831 A1 Nov. 24, 2011

(30) Foreign Application Priority Data
May 24, 2010 (JP) .................... 2010-118666

(51) Int. Cl.
*H04N 13/04* (2006.01)
(52) U.S. Cl.
USPC ............... 348/56; 348/51; 348/53; 348/54; 348/55
(58) Field of Classification Search
None
See application file for complete search history.

(56) References Cited

U.S. PATENT DOCUMENTS

| 7,738,055 | B2* | 6/2010 | Egi et al. ...................... 349/96 |
| 8,542,326 | B2* | 9/2013 | MacNaughton et al. ........ 349/15 |
| 2007/0279369 | A1* | 12/2007 | Yao et al. ..................... 345/102 |
| 2010/0013957 | A1* | 1/2010 | Miyasaka et al. .......... 348/229.1 |
| 2010/0066820 | A1* | 3/2010 | Park et al. ..................... 348/53 |
| 2010/0238274 | A1* | 9/2010 | Kim et al. ..................... 348/51 |
| 2010/0309381 | A1* | 12/2010 | Nakagawa et al. ........... 348/705 |
| 2011/0157332 | A1* | 6/2011 | Kim et al. ..................... 348/56 |

FOREIGN PATENT DOCUMENTS

| JP | 10240212 A | 9/1998 |
| JP | 2006186768 A | 7/2006 |
| JP | 2009152897 A | 7/2009 |
| WO | 2008102883 | 8/2008 |

OTHER PUBLICATIONS

Office Action issued for corresponding Japanese Patent Application No. 2010-118666, dated May 29, 2012.

* cited by examiner

*Primary Examiner* — Joseph Ustaris
*Assistant Examiner* — Maryam Nasri
(74) *Attorney, Agent, or Firm* — Matthew B. Dernier, Esq.; Gibson & Dernier LLP

(57) ABSTRACT

A timing signal generation unit of a content playback device generates a shutter control signal requesting the opening or closing of a shutter of a lens among one or more lenses of a pair of shutter glasses worn by a user viewing a display panel adapted to display content, and a backlight control signal requesting a backlight of the display panel to be turned on at least when the shutter is open. A transmitter unit transmits the shutter control signal to the shutter glasses. The timing signal generation unit changes at least one of the timing of turning on the backlight or the timing of opening the shutter of the lens of the shutter glasses.

6 Claims, 6 Drawing Sheets

CONTENT PLAYBACK DEVICE, CONTENT PLAYBACK METHOD, AND CONTENT DISPLAY

BACKGROUND OF THE INVENTION

1. Field of the Invention

The present invention relates to a content playback device, content playback method, and content display system.

2. Description of the Related Art

Recently, the performance of consumer television is improving and three-dimensional television sets capable of presenting stereoscopic images with depth are becoming available to the public. Various methods are used to implement three-dimensional television. Some methods require wearing shutter glasses for viewing images including an image for the left eye and an image for the right eye alternately displayed using time-division multiplexing.

In a method that requires wearing special-purpose shutter glasses to view stereoscopic images, the user should naturally wear shutter glasses. The requirement for wearing glasses has led us to pursue new applications of shutter glasses in addition to its use as a means to view stereoscopic images.

SUMMARY OF THE INVENTION

The present invention addresses this issue and a purpose thereof is to provide new applications of shutter glasses for viewing stereoscopic images.

One embodiment of the present invention that addresses the issue is a content playback device. The device comprises: a timing signal generation unit configured to generate a shutter control signal requesting the opening or closing of a shutter of a lens among one or more lenses of a pair of shutter glasses worn by a user viewing a display panel adapted to display content, and a backlight control signal requesting a backlight of the display panel to be turned on at least when the shutter is open; and a transmitter unit configured to transmit the shutter control signal to the shutter glasses. The timing signal generation unit changes at least one of the timing of turning on the backlight or the timing of opening the shutter of the lens of the shutter glasses.

Another embodiment of the present invention is a content playback method. The method comprises; generating, using a processor, a shutter control signal requesting the opening or closing of a shutter of a lens among one or more lenses of a pair of shutter glasses worn by a user viewing a display panel adapted to display content; generating, using the processor, a backlight control signal requesting a backlight of the display panel to be turned on at least when the shutter is open; changing, using the processor, at least one of the timing of turning on the backlight or the timing of opening the shutter of the lens of the shutter glasses; and transmitting, using the processor, the shutter control signal to the shutter glasses.

Still another embodiment of the present invention is a content display system. The content display system comprises a content playback device, a display panel adapted to display content played back by the content playback device, and a pair of shutter glasses for viewing the display panel. The content playback device includes a timing signal generation unit configured to generate a shutter control signal requesting the opening or closing of a shutter of a lens among one or more lenses of the shutter glasses worn by a user viewing the display panel, and a backlight control signal requesting a backlight of the display panel to be turned on at least when the shutter is open such that the timing signal generation unit changes at least one of the timing of turning on the backlight or the timing of opening the shutter of the lens of the shutter glasses. The shutter glasses include a shutter timing control unit configured to acquire the shutter control signal from the content playback device and to control the shutter timing of the shutter of a left lens and the shutter of a right lens of the set of shutter glasses in accordance with the shutter control signal. The display panel includes a display unit configured to display an image of the content that is acquired from the content playback device and that is to be played back, and a backlight driving unit configured to turn on the backlight in accordance with the backlight control signal acquired from the content playback device.

Optional combinations of the aforementioned constituting elements, and implementations of the invention in the form of methods, apparatuses, systems, recording mediums and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Base Technology

A description will now be given of the three-dimensional system that serves as a base of the embodiment.

Since human eyes are spaced apart by about 6 cm, parallax is produced between an image viewed from the left eye and an image viewed from the right eye. Images of an object in a three-dimensional space as viewed from different viewpoints are referred to as "parallax images". Human brain is said to recognize the depth of an object using parallax images perceived by the left and right eyes. For this reason, by projecting a parallax image perceived by the left eye and a parallax image perceived by the right eye to the respective eyes, an image having a depth is perceived by one. Hereinafter, images that include left and right parallax images will be referred to as "stereoscopic images" and the term will be used to mean three-dimensional images.

Figure 1:
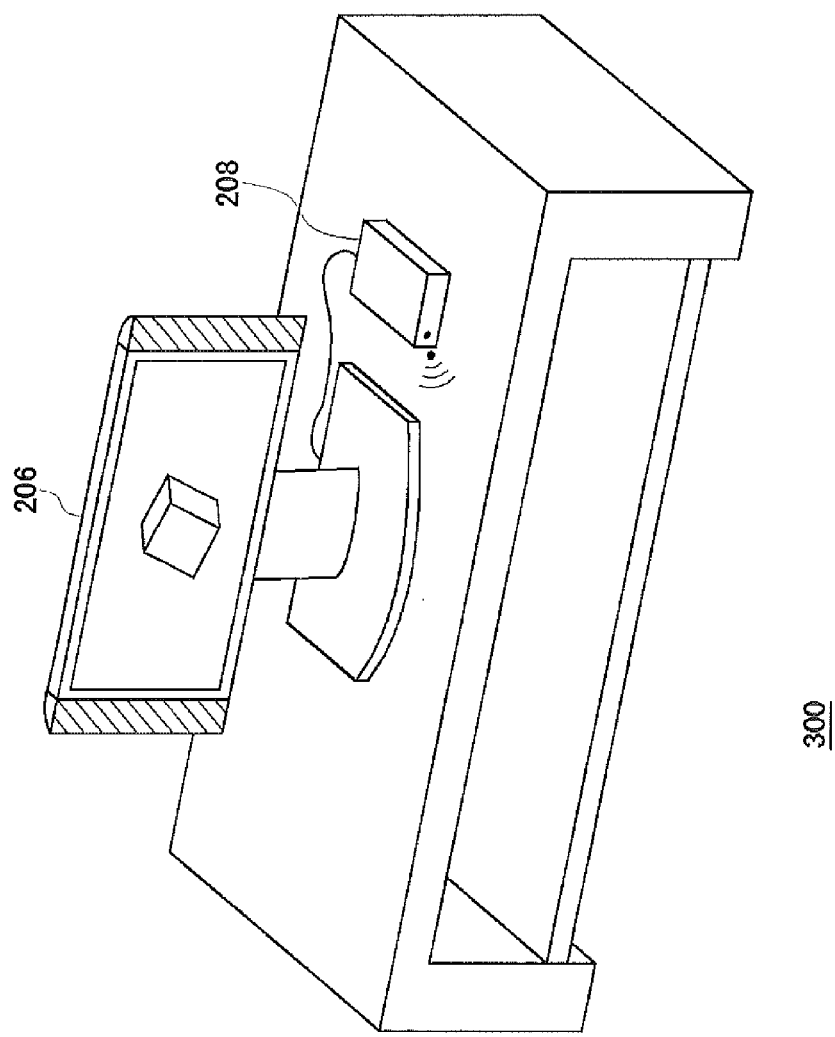
FIG. 1 is a schematic view of a shutter-based three-dimensional image display system.

FIG. 1 is a schematic view of a shutter-based three-dimensional television system 300 utilizing parallax images. The three-dimensional television system 300 comprises a three-dimensional television 200 for projecting parallax images, shutter glasses 400 used to view parallax images, and a content playback device 300.

The three-dimensional television 200 alternately presents the left-eye parallax image and the right-eye parallax image acquired from the content playback device 300 using time-division multiplexing. The content playback device 300 originates a radio infrared synchronization signal indicating the timing of display of the parallax images on the three-dimensional television 200. The shutter glasses 400 are provided with a receiver (not shown) for receiving a synchronizing signal transmitted from the content playback device 300 and shutters the left or right lens in accordance with the received synchronizing signal. The shutter is implemented by using a known technology for liquid crystal shutters.

More specifically, when the three-dimensional television 200 displays a left-eye parallax image, the shutter glasses 400 receive a signal indicating that the shutter of the right eye lens should be closed from the content playback device 300. The shutter glasses 400 shield an image entering the right eye by closing the shutter of the right eye lens in accordance with the received signal. This results in only the left-eye parallax image being projected to the left eye of the user when the three-dimensional television 200 displays the left-eye parallax image. Conversely, when the three-dimensional television 200 displays the right-eye parallax image, only the right-eye parallax image is projected to the right eye of the user by allowing the shutter glasses 400 to close the shutter of the left eye lens.

FIG. 1 is an illustration showing the content playback device 300 and the three-dimensional television 200 as separate devices. For example, the content playback device 300 may be a desktop game device. All or some of the functions of the content playback device 300 may be built in the three-dimensional television 200.

Figure 2:
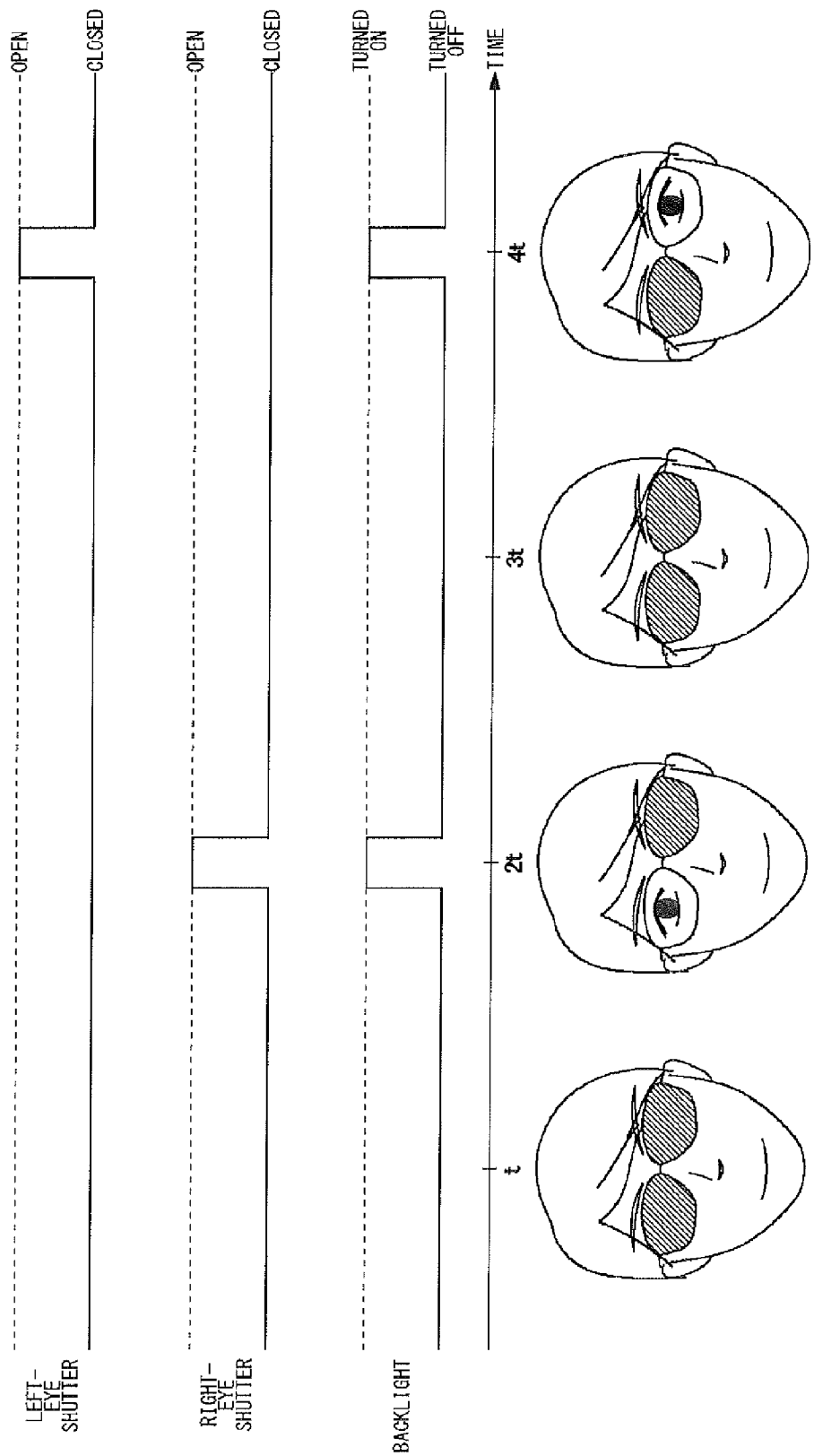
FIG. 2 shows a relation between the timing of driving shutter glasses and the timing of turning on a backlight in a three-dimensional television occurring when a stereoscopic image is displayed.

FIG. 2 shows a relation between the timing of driving the shutter glasses 400 and the timing of display of a parallax image in the three-dimensional television 200 occurring when a stereoscopic image is displayed. FIG. 2 shows that at the same time as the right-eye shutter of the shutter glasses 400 is open for a predetermined period of time (e.g., 10 milliseconds) at time 2*t*, the backlight of the display panel of the three-dimensional television 200 is turned on for the same period of time. FIG. 2 also shows that at the same time as the left-eye shutter of the shutter glasses 400 is open for a predetermined period of time at time 4*t*, the backlight of the display panel of the three-dimensional television 200 is turned on. At the other points of time, the right-eye shutter and the left-eye shutter of the shutter glasses 400 are closed and the backlight of the display panel of the three-dimensional television 200 is turned off.

The three-dimensional television 200 displays a right-eye parallax image at time 2*t* so as to present the right-eye parallax image to the right eye of the user. At time 4*t*, the three-dimensional television 200 displays a left-eye parallax image so as to present the left-eye parallax image to the left eye of the user. In this way, three-dimensional images with depth are presented to the user.

Embodiment

A description will be given of a summary of the embodiment of the present invention. In the embodiment, the amount of light projected to the user's eye is controlled by changing the period of opening and closing the shutter of the shutter glasses 400 relative to the period of turning on and off the backlight of the display panel displaying content. In this way, the system is controlled so that ambient light around the display panel is shielded or users not wearing the shutter glasses 400 find it hard to view a selected content displayed on the display panel.

Figure 3:
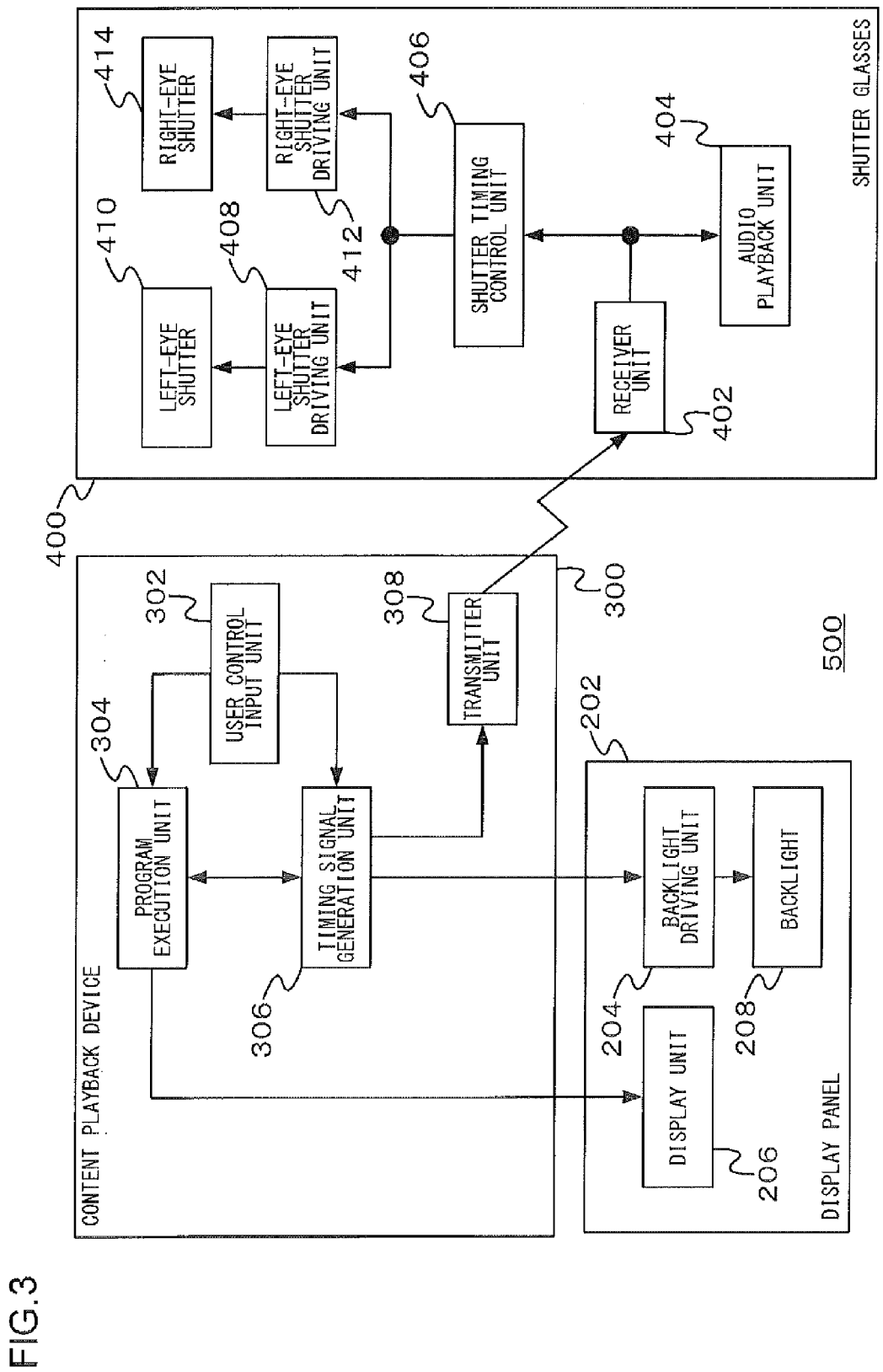
FIG. 3 schematically shows functional features implementing the content display system according to the embodiment.

FIG. 3 schematically shows the functional features of a content display system 500 according to the embodiment. The content display system 500 includes a display panel 202, a content playback device 300, and shutter glasses 400.

The content playback device 300 includes a user control reception unit 302, a program execution unit 304, a timing signal generation unit 306, and a transmitter unit 308.

The user control reception unit 302 is an interface that receives user control of the content playback device 300. The program execution unit 304 executes a content program to play content in accordance with user control acquired from the user control reception unit 302. For example, a content program may be a browser for viewing information on the Internet, a client for electronic mail, a program for chatting, or a program for playing back games, movies, music, etc. The program execution unit 304 outputs a screen for execution of a content program to the display panel 202.

The timing signal generation unit 306 generates a backlight control signal for requesting the turning on and off of the backlight of the display panel 202 and a shutter control signal for requesting the opening and closing of the shutters of the left and right lenses of the glass shutters 400 worn by the user viewing the display panel 202.

When the program executed by the program execution unit 304 is a program for stereoscopic content, the timing signal generation unit 306 generates a backlight control signal and a shutter control signal so as to project a left-eye parallax image to the user's left eye and to project a right-eye parallax image to the user's right eye, as shown in FIG. 2. When the program executed by the program execution unit 304 is a program for ordinary two-dimensional content such as e-main client, the timing signal generation unit 306 generates a shutter control signal that causes the left and right lenses of the shutter glasses 400 to remain open absent any explicit instruction from the user via the user control reception unit 302.

The transmitter unit 308 transmits the shutter control signal generated by the timing signal generation unit 306 to the shutter glasses 400. The transmitter unit 308 transmits an audio signal included in the content acquired from the program execution unit 304 via the timing signal generation unit 306 to the shutter glasses 400. The transmission is achieved by a known technology such as infrared communication or near field communication.

The display panel 202 includes a display unit 206, a backlight driving unit 204, and a backlight 208. For example, the display panel 202 may be a display of the aforementioned three-dimensional television 200 and is implemented using the liquid crystal panel technology.

The backlight driving unit 204 drives the backlight 208 in accordance with a backlight control signal acquired from the timing signal generation unit 306. The display unit 206 displays content acquired from the program execution unit 304. Preferably, the backlight 208 is capable of high-speed response on the order of several milliseconds and turned on and off accordingly. For example, the backlight 208 may be a light-emitting diode.

The shutter glasses 400 include a receiver unit 402, an audio playback unit 404, a shutter timing control unit 406, a left-eye shutter driving unit 408, a left-eye shutter 410, a right-eye shutter driving unit 412, and a right-eye shutter.

The audio playback unit 404 plays back an audio signal included in the content being played back in the content playback device 300 and acquired from the content playback device 300 via the receiver unit 402. The audio playback unit 404 is implemented by a known technology for earphones and headphones and is built into the shutter glasses 400.

The shutter timing control unit 406 controls the operation of the left-eye shutter driving unit 408 and the right-eye shutter driving unit 412 in accordance with a shutter control signal acquired from the content playback device 300 via the receiver unit 402. Under the control of the shutter timing control unit 406, the left-eye shutter driving unit 408 opens and closes the left-eye shutter 410, which is the shutter for the left-eye lens of the shutter glasses 400. Similarly, the right-eye shutter driving unit 412 opens and closes the right-eye shutter 414, which is the shutter for the right-eye lens of the shutter glasses 400, under the control of the shutter timing control unit 406.

FIG. 3 schematically shows functional features implementing the content display system 500 according to the embodiment so that the other features are omitted. The elements depicted in FIG. 3 as functional blocks for performing various processes are implemented in hardware by a CPU, main memory, or other LSI's, and in software by a program etc., loaded into the main memory. Therefore, it will be obvious to those skilled in the art that the functional blocks may be implemented in a variety of manners by hardware only, software only, or a combination of thereof.

For example, the content playback device 300 may be a desktop game device. The display panel 202 may be a display of the three-dimensional television. In the case that the content playback device 300 is a mobile game device or a cell phone, the content playback device 300 and the display panel 202 are built in the same device.

A description will be given of the relation between a backlight control signal and a shutter control signal generated by the timing signal generation unit 306. When the backlight 208 of the display panel 202 is turned on and the left-eye shutter 410 of the shutter glasses 400 worn by the user is open, the image on the display unit 206 of the display panel is projected to the left eye of the user. Similarly, when the backlight 208 of the display panel 202 is turned on and the right-eye shutter 414 of the shutter glasses 400 worn by the user is open, the image on the display unit 206 is projected to the right eye of the user.

Conversely, when the backlight 208 of the display panel 202 is turned on but the shutter of the shutter glasses 400 is closed, the image on the display unit 206 is not projected to the eye of the user. When the shutter of the shutter glasses 400 is open but the backlight 208 of the display panel 202 is turned off, the image on the display unit 206 is not projected to the eye of the user.

Accordingly, the timing signal generation unit 306 generates a backlight control signal and a shutter control signal so that at least the backlight 208 of the display panel 202, controlled by the backlight control signal, is turned on when one or both of the left-eye shutter 410 and the right-eye shutter 414 of the shutter glasses 400 controlled by the shutter control signal. The shutter(s) of the shutter glasses 400 may not necessarily be open even when the backlight 208 is turned on. In other words, the frequency of turning the backlight 208 on is higher than the frequency of opening the shutter of the shutter glasses 400.

By controlling the backlight control signal and the shutter control signal as described above, the amount of light projected to the user's eye can be controlled. For example, a case in which the backlight 208 is turned on and off at 120 Hz will be considered. The amount of light projected to the user's eyes when the shutters of the shutter glasses 400 are opened and closed at 30 Hz will be a quarter of the amount of light projected when the backlight control signal and the shutter control signal are synchronized so that the shutters of the shutter glasses 400 are also opened and closed at 120 Hz ($30/120=1/4$).

The light projected to the user's eye not only contains light originating from the backlight 208 emitted from the display panel 202 but also contains ambient light, which includes natural light such as sun light and light originating from an artificial light source such as a fluorescent lamp.

A description will be given of the principle whereby "shielding of ambient light" and "privacy filter" are implemented by the content display system 500 according to the embodiment, by using the above-described technology of controlling the amount of light projected to the user's eye by synchronizing the backlight control signal and the shutter control signal.

Figure 4:
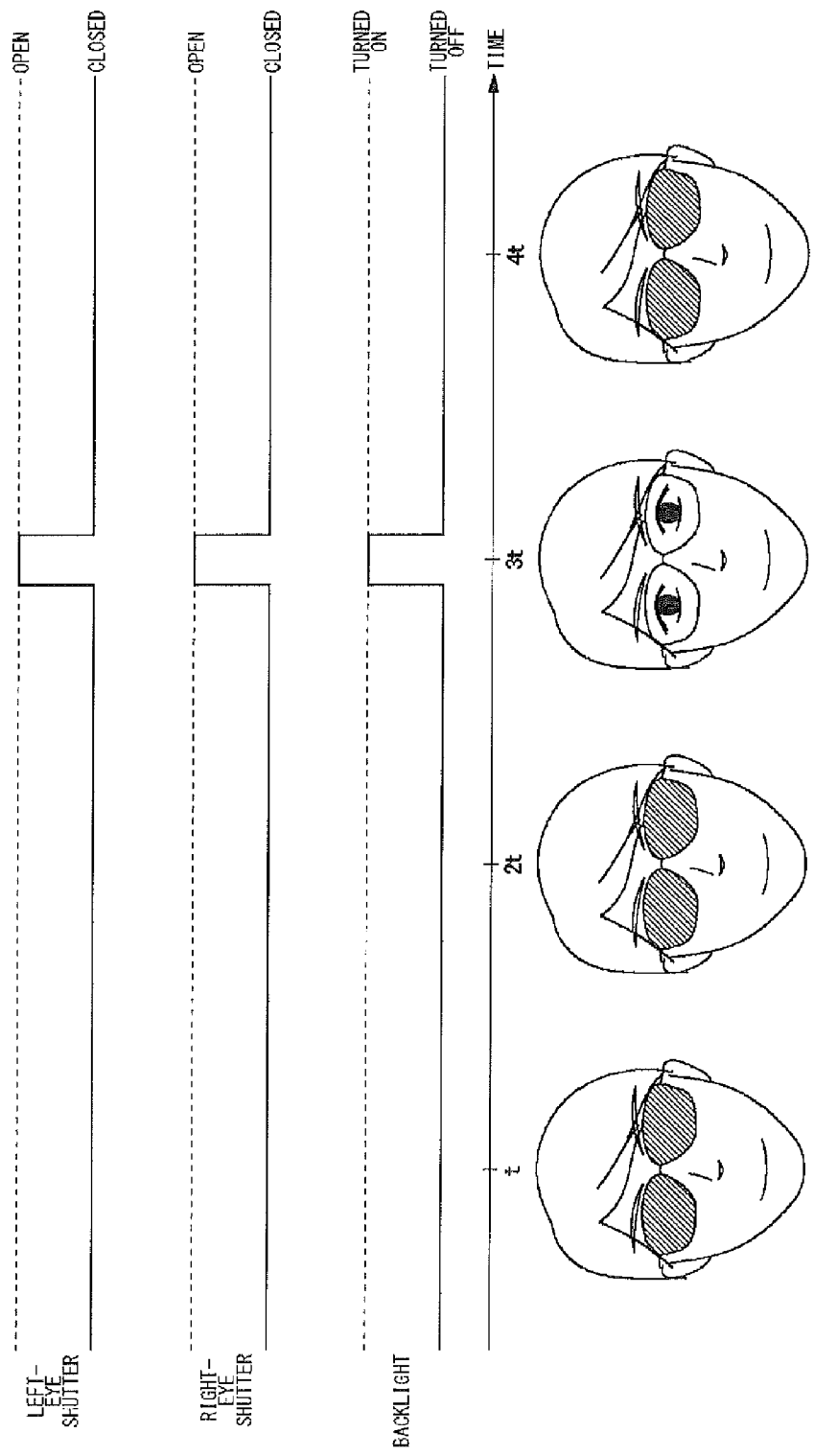
FIG. 4 shows a relation between the timing of driving the shutter glasses and the timing of turning on the backlight occurring when ambient light is to be shielded.

When the display pane 202 is exposed to a light source emitting light more intense than the light generated by the backlight 208 (e.g., sun light), the user may experience difficulty in viewing an image on the display panel 202. FIG. 4 shows a relation between the timing of driving the shutter glasses 400 and the timing of turning on the backlight 208 occurring when the intense ambient light is to be shielded.

FIG. 4 shows that the backlight 208 is turned at a frequency about 1/4 of the normal frequency and both shutters of the shutter glasses 400 are open while the backlight 208 is turned on. When the backlight 208 is turned on at the normal frequency, the backlight 208 is turned on at time t, $2t$, and $4t$ as well as at time $3t$, but FIG. 4 shows that the backlight 208 is turned on only at time $3t$. Since ambient light is projected to the user's eye only while the shutter of the shutter glasses 400 is open, the above approach reduces the amount of ambient light projected to the user's eye as compared to the case where the shutter glasses 400 are not worn. As a result, the amount of light originating from the backlight 208 is increased in relation to the amount of ambient light projected to the user's eye so that the ease of viewing the display panel 202 is improved. This is because the amount of ambient light projected to the user's eye while the display panel 202 does not display images is reduced.

For shielding of ambient light projected, the timing signal generation unit 306 generates a backlight control signal that turns on the backlight 208 at a frequency lower than the normal frequency. For all of a plurality of contents displayed on the display unit 206, the timing signal generation unit 306 generates a shutter control signal that causes the backlight 208 to be turned in synchronization with the opening of the left and right shutters of the shutter glasses 400.

Figure 5:
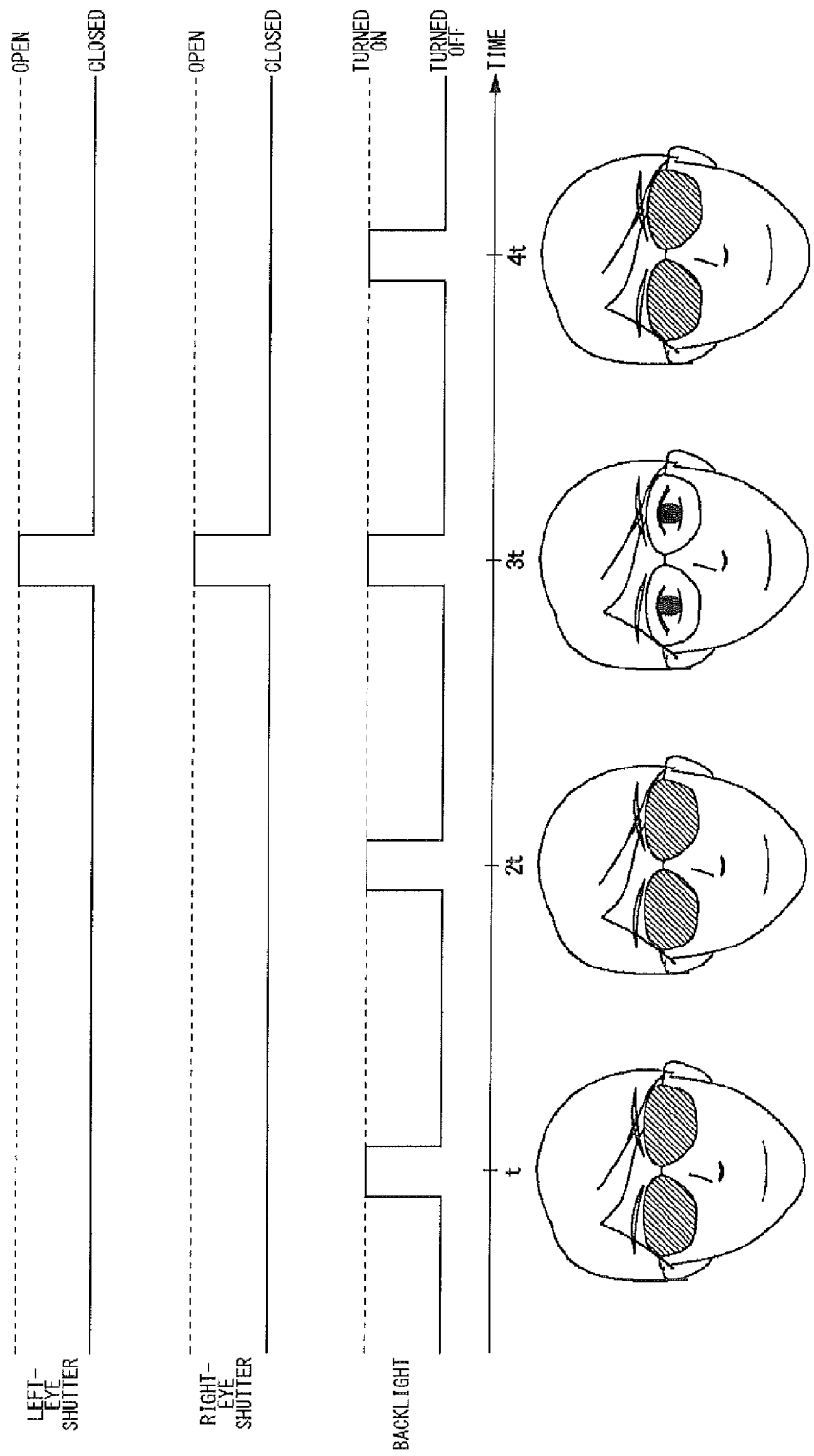
FIG. 5 shows a relation between the timing of driving the shutter glasses and the timing of turning on the backlight occurring when enabling a privacy filter.

FIG. 5 shows a relation between the timing of driving the shutter glasses 400 and the timing of turning on the backlight 208 occurring when enabling a privacy filter. The phrase "enabling a privacy filter" means reducing the ease of viewing a selected content by users not wearing the shutter glasses 400. A privacy filter can be enabled for an arbitrary content program. For example, a privacy filter may be enabled for a content program expected to be used by individuals (e.g., electronic mail).

FIG. 5 shows that the backlight 208 is turned at the normal frequency but the shutters of the shutter glasses 400 are opened and closed at a frame rate 1/4 that of the normal frequency. In other words, the backlight 208 is turned on at time t, $2t$, $3t$, and $4t$ but the shutters of the shutter glasses 400 are opened only at time $3t$.

When a user request to enable a privacy filter for a selected content is acquired via the user control reception unit 302, the program execution unit 304 outputs a screen for execution of the content program to the displayed unit 206 only at time 3t in FIG. 5. For other contents not requested to be filtered by a privacy filter, the program execution unit 304 outputs a screen for execution of the content program to the display unit 206 at the normal frame rate. In other words, the unit 304 outputs a screen for execution of the content program to the display unit 206 at time t, 2t, 3t, and 4t in FIG. 5. The normal frequency of turning on and off the backlight 208 is the same as the normal frame rate at which the program execution unit 304 outputs the screen to the display unit 206.

When the user not wearing the shutter glasses 400 views the display panel 202, the user views only the content for which a privacy filter is not enabled at time t, 2t, and 4t in FIG. 5. At time 3t, the user views the selected content for which a privacy filter is enabled as well as the contents for which a privacy filter is not enabled. For this reason, the contents displayed at time t, 2t, and 4t as well as at time 3t for which a privacy filter is not enabled gives more impression on the user not wearing the shutter glasses 400 than the selected content displayed only at time 3t for which a privacy filter is enabled. As a result, it is less easy for the user to view the selected content for which a privacy filter is enabled.

On the other hand, when the user wearing the shutter glasses 400 views the display panel 202, the user can perceive only the image displayed at time 3t in FIG. 5. Thus, since all contents are viewed equally irrespective of whether a privacy filter is enabled, the user does not feel that the selected content for which a privacy filter is enabled is more difficult to view than the other contents.

The selected content for which a privacy content is enabled is displayed on the display unit 206 in front of the other contents so as not to be hidden by the other contents. The request to enable a privacy filter is acquired from the user via the user control reception unit 302 and stored in a storage (not shown) in the timing signal generation unit 306. The user may change the request indicating whether a privacy filter should be enabled at any time via the user control reception unit 302.

Thus, the timing signal generation unit 306 generates a shutter control signal ensuring that the frequency of opening the left and right lenses of the shutter glasses 400 is lower than the normal frequency. At the same time, the program execution unit 304 outputs the selected content for which a privacy filter should be enabled to the display unit 206 at a frame rate synchronized with that frequency. This allows a privacy filter to be enabled for the selected content. This is more useful than a physical privacy filter such as a film in that control over whether a privacy filter should be enabled can be exercised for each content.

Figure 6:
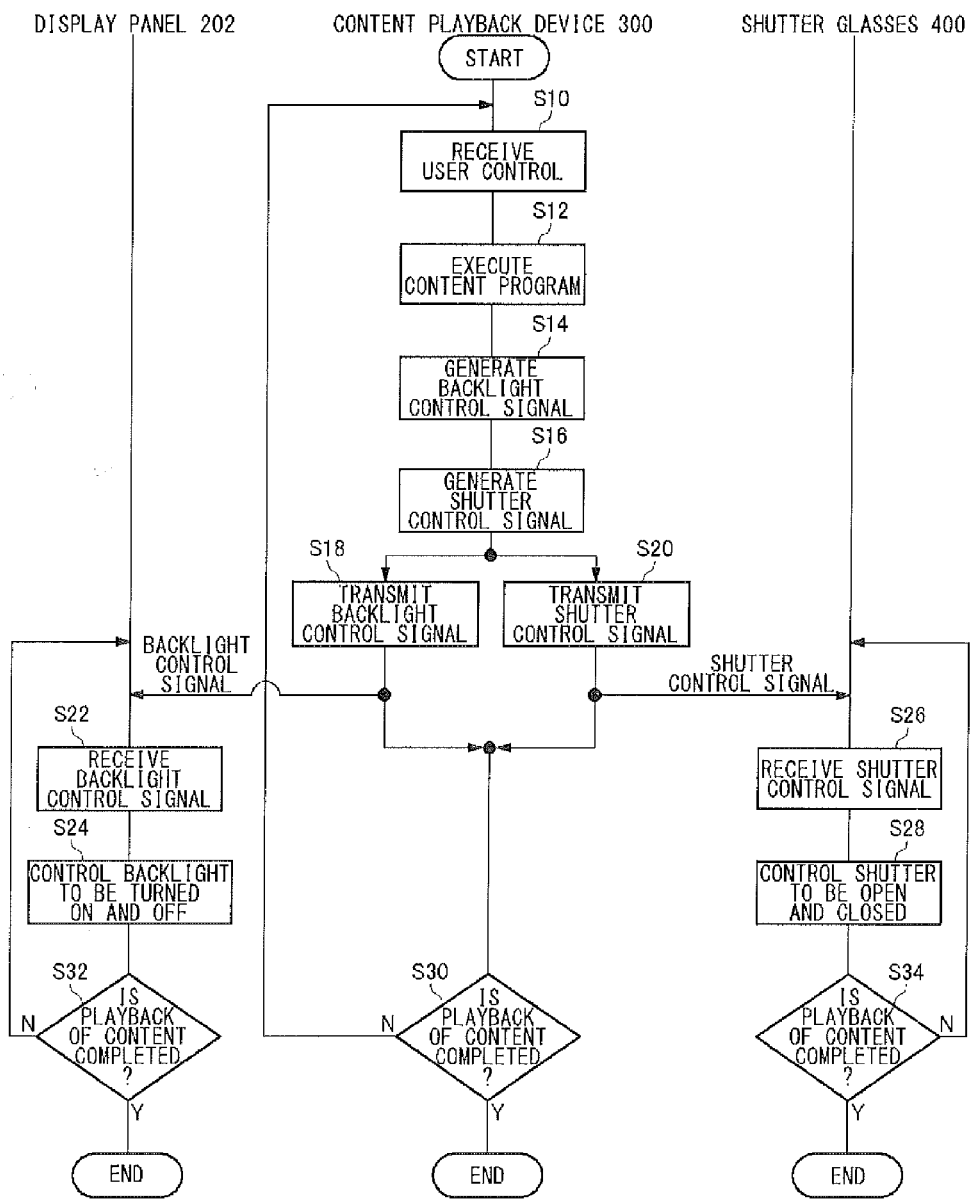
FIG. 6 is a sequence chart showing steps and communication procedures of the content display system according to the embodiment in a time series.

FIG. 6 is a sequence chart showing steps and communication procedures of the content display system 500 according to the embodiment in a time series. Referring to the sequence chart shown in FIG. 6, the steps and communication procedures in the respective components are denoted by a combination of S (initial letter of Step), which indicates "step", and a numeral. When a determination is performed in a step denoted by a combination of S and a numeral and when the result of determination is affirmative, Y (initial letter of Yes) is used to indicate the affirmative determination (e.g., Y in S30). Conversely, when the result of determination is negative, N (initial letter of No) is used to indicate the negative determination (e.g., N in S30). The steps in the sequence are started when the user control reception unit 302 acquires an input for user control.

The user control reception unit 302 receives a user request to execute a content program and a request indicating whether a privacy filter should be enabled (S10). The program execution unit 304 executes the requested content program (S12).

The timing signal generation unit 306 generates a backlight control signal in accordance with the request indicating whether a privacy filter should be enabled (S14). The timing signal generation unit 306 also generates a shutter control signal in accordance with the request indicating whether a privacy filter should be enabled (S16).

The timing signal generation unit 306 outputs the generated backlight control signal to the backlight driving unit 204 (S18). The transmitter unit 308 wirelessly transmits the shutter control signal acquired from the timing signal generation unit 306 to the shutter glasses 400 (S20).

The backlight driving unit 204 receives the backlight control signal from the timing signal generation unit 306 (S22) and controls the backlight 208 to be turned on and off (S24) in accordance with the signal. The receiver unit 402 receives the shutter control signal from the transmitter unit 308 (S28). The shutter timing control unit 406 drives the left-eye shutter driving unit 408 and the right-eye shutter driving unit 412 in accordance with the shutter control signal acquired from the receiver unit 402 so as to control the left-eye shutter 410 and the right-eye shutter 414 to be opened and closed (S28).

If the playback of the content being executed is not completed (N in S30), the program execution unit 304 returns to step S10 and continues the above-mentioned process. If the playback of the content by the program execution unit 304 is not completed and if a backlight control signal is sent (N in S32), the backlight driving unit 204 returns to step S22 and continues the process. If the playback of the content is not completed by the program execution unit 304 and if a shutter control signal is sent (N in S34), the receiver unit 402 returns to step S26 and continues the process.

When the playback of the content by the program execution unit 304 is completed (Y in S30), (Y in S32), or (Y in S34), the process according to the sequence is terminated.

The operation according to the above-mentioned configuration is as follows. The user plays back a desired content using the content playback device 300 and views the content using the shutter glasses 400. When the user issues a request indicating that ambient light should be shielded or a privacy filter should be enabled to the content playback device 300, the timing signal generation unit 306 changes the way the backlight control signal and the shutter control signal are synchronized in accordance with the request. When the user request indicates that a privacy filter should be enabled for a selected content, the program execution unit 304 lowers the frame rate at which the content is output to the display panel 202.

As described above, according to the embodiment, new applications of the shutter glasses 400 are provided in addition to the application of the glasses as a tool to view stereoscopic images. For example, the glasses can be used to shield ambient light or can serve as a privacy filter while ordinary two-dimensional images are being displayed.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The description above assumes that only one pair of shutter glasses 400 is used. Alternatively, there may be a plurality of pairs of shutter glasses 400. By defining unique identifiers for the plurality of pairs of shutter glasses 400, the content playback device 300 can identify the plurality of shutter glasses 400 uniquely. This makes it possible to enable a privacy filter for each of a plurality of users or to present different contents to the plurality of users by dividing a screen and sharing it using time-division multiplexing.

What is claimed is:

1. A content playback device comprising:
a timing signal generation unit configured to generate a shutter control signal requesting the opening or closing of a shutter of a lens among one or more lenses of a pair of shutter glasses worn by a user viewing a display panel adapted to display content, and a backlight control signal requesting a backlight of the display panel to be turned on at least when the shutter is open; and
a transmitter unit configured to transmit the shutter control signal to the shutter glasses,
wherein the timing signal generation unit changes at least one of the timing of turning on the backlight or the timing of opening the shutter of the lens of the shutter glasses, and
wherein the shutter control signal corresponds to the backlight control signal such that: (i) during a period of time the shutter of the lenses of the pair of shutter glasses are both open, and (ii) the backlight is turned on for at least a portion of the period of time.

2. The content playback device according to claim 1, wherein the timing signal generation unit generates the backlight control signal, which requests the backlight to be turned on, at a lower frequency when the display is to be shielded from ambient light around the display panel.

3. The content playback device according to claim 1, further comprising:
a program execution unit configured to execute a program for implementing the content and to output the content to the display panel,
wherein the timing signal generation unit generates, when a privacy filter is to be enabled for selected content among a plurality of content, the shutter control signal, which requests the frequency of opening the lens of the shutter glasses to be lower than the frequency of turning on the backlight, and
the program execution unit outputs, when the privacy filter is enabled for selected content among a plurality of content, the selected content to the display panel in synchronization with the timing of opening the shutter of the lens of the shutter glasses.

4. A content playback method comprising:
generating, using a processor, a shutter control signal requesting the opening or closing of a shutter of a lens among one or more lenses of a pair of shutter glasses worn by a user viewing a display panel adapted to display content;
generating, using the processor, a backlight control signal requesting a backlight of the display panel to be turned on at least when the shutter is open;
changing, using the processor, at least one of the timing of turning on the backlight or the timing of opening the shutter of the lens of the shutter glasses such: (i) during a period of time the shutter of the lenses of the pair of shutter glasses are both open, and (ii) the backlight is turned on for at least a portion of the period of time; and
transmitting, using the processor, the shutter control signal to the shutter glasses.

5. A non-transitory computer-readable medium with a program embedded thereon, the program comprising:
a module configured to generate a shutter control signal requesting the opening or closing of a shutter of a lens among one or more lenses of a pair of shutter glasses worn by a user viewing a display panel adapted to display content;
generating a backlight control signal requesting a backlight of the display panel to be turned on at least when the shutter is open;
changing at least one of the timing of turning on the backlight or the timing of opening the shutter of the lens of the shutter glasses to correspond to one another such that: (i) during a period of time the shutter of the lenses of the pair of shutter glasses are both open, and (ii) the backlight is turned on for at least a portion of the period of time; and
transmitting the shutter control signal to the shutter glasses.

6. A content display system comprising:
a content playback device;
a display panel adapted to display content that is played back by the content playback device; and
a pair of shutter glasses for viewing the display panel,
wherein the content playback device includes a timing signal generation unit configured to generate a shutter control signal requesting the opening or closing of a shutter of a lens among one or more lenses of the shutter glasses worn by a user viewing the display panel, and a backlight control signal requesting a backlight of the display panel to be turned on at least when the shutter is open such that the timing signal generation unit changes at least one of the timing of turning on the backlight or the timing of opening the shutter of the lens of the shutter glasses,
wherein the shutter glasses include a shutter timing control unit configured to acquire the shutter control signal from the content playback device and to control the shutter timing of the shutter of a left lens and the shutter of a right lens of the set of shutter glasses in accordance with the shutter control signal,
wherein the display panel includes a display unit configured to display an image of the content that is acquired from the content playback device and that is to be played back, and a backlight driving unit configured to turn on the backlight in accordance with the backlight control signal acquired from the content playback device, and
wherein the shutter control signal corresponds to the backlight control signal such that: (i) during a period of time the shutter of the lenses of the pair of shutter glasses are both open, and (ii) the backlight is turned on for at least a portion of the period of time.

* * * * *